May 8, 1934.    P. B. PARKS ET AL    1,957,664
THERMOSTATIC CONTROL MECHANISM
Filed Dec. 16, 1932
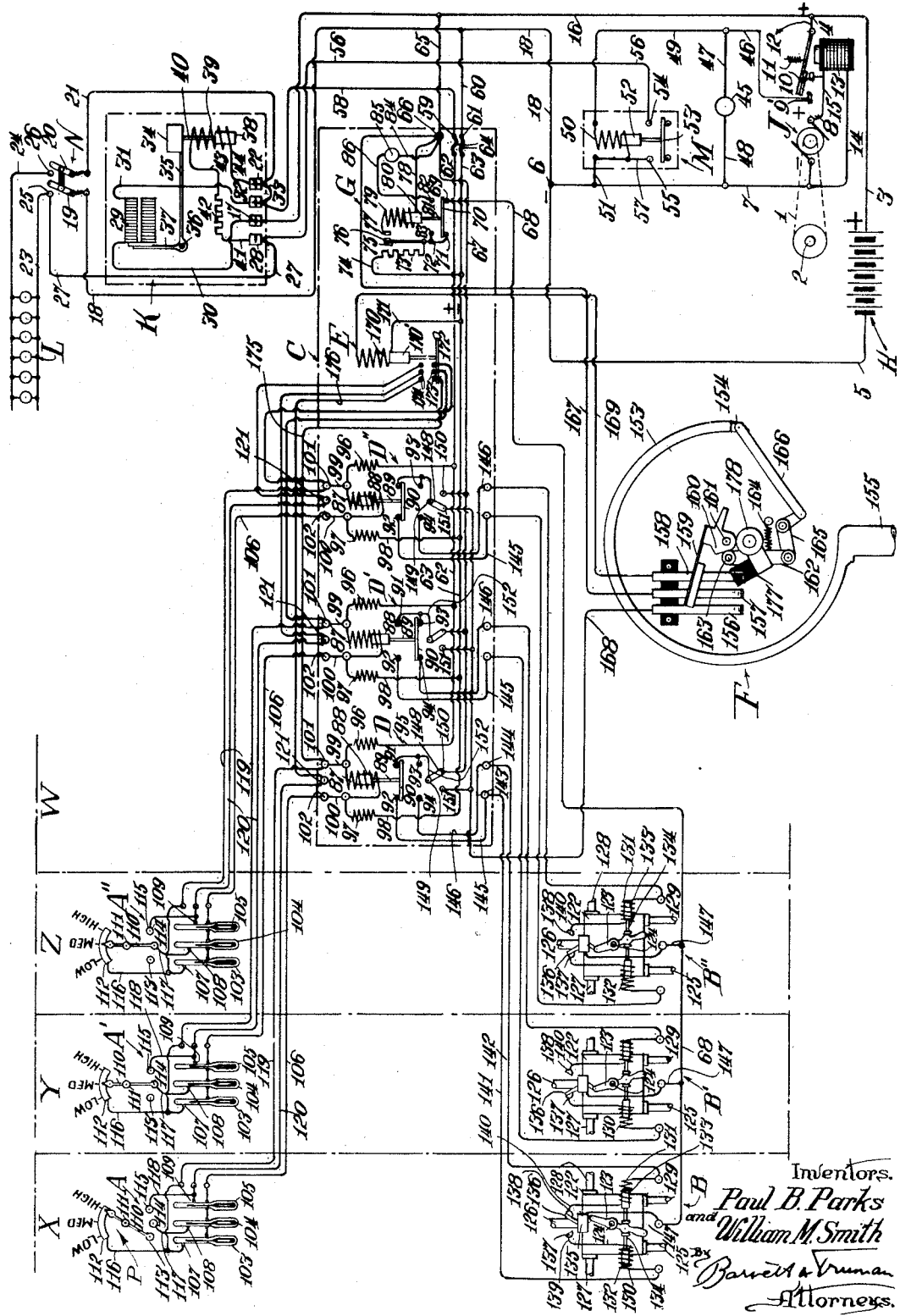
Inventors.
Paul B. Parks
and William M. Smith
By Barrett & Truman
Attorneys.

Patented May 8, 1934

1,957,664

UNITED STATES PATENT OFFICE 1,957,664

THERMOSTATIC CONTROL MECHANISM

Paul B. Parks, Oak Park, and William M. Smith, Chicago, Ill., assignors to Vapor Car Heating Company, Inc., Chicago, Ill., a corporation of New York Application December 16, 1932, Serial No. 647,586

13 Claims. (Cl. 236—78)

This invention relates to certain new and useful improvements in a thermostatic control mechanism and more particularly to an improved thermostatically controlled, electrically operated mechanism for separately and independently regulating the heat supply in one or more of a series of separate closed compartments.

While the invention has been designed more particularly for use in a railway car or other moving vehicle, many of the features thereof are equally adaptable for use with stationary enclosures, such as the rooms of ordinary buildings.

Briefly described, a thermostatic mechanism is positioned in each compartment, said mechanism comprising a plurality of thermostats, each adapted to maintain approximately a predetermined temperature in the compartment, together with a manually adjustable means for determining which of the thermostats shall be in control at any one time. Also situated in or adjacent to the compartment is a valve, under the control of the thermostatic mechanism, for regulating the supply of heating medium to that compartment. Associated with each valve is an electrically actuated valve-operating mechanism adapted to move the valve automatically to open or closed positions. Located at some convenient position on the car, or other structure to be heated, is a panel board in or on which is located all of the relays and similar devices, through which the several thermostatic mechanisms control the several valve operating mechanisms. Included among these devices grouped on the control panel is an automatic circuit breaker comprising a signal light which is illuminated when one of the actuating circuits is broken. By opening or closing test switches in the several lines, the circuit in which trouble is located can quickly be determined by means of this signal device.

The source of power for the electric control and operating circuits comprises a battery and a generator driven from the running gear of the car. A voltage regulator is provided for the lighting system on the car which is supplied from this same source of power, and in order that the thermostatic control circuit may not be overloaded, the voltage regulator is also included in these circuits, means being provided for cutting the voltage regulator automatically into service whenever the generator has reached a predetermined speed.

The general object of this invention is to provide an improved thermostatic control mechanism of the type briefly described hereinabove and disclosed more in detail in the specifications which follow.

Another object is to provide an improved thermostatic control mechanism in which the operating relays are grouped on a single control panel.

Another object is to provide such a control system with a single selector relay which cooperates with the temperature control systems in the several separate compartments for maintaining a single predetermined temperature in all of these compartments when the car is out of service.

Another object is to provide a control system of this type with an automatically reclosing circuit breaker embodying a signal device whereby trouble is indicated and may be quickly localized in one or more of the several circuits.

Another object is to provide improved means for preventing the voltage from exceeding a predetermined maximum in the thermostatic control circuits.

Other objects and advantages of this invention will be more apparent from the following detailed description of one approved mechanism constructed and operating according to the principles of this invention.

The accompanying drawing is in the form of a wiring diagram illustrating conventionally the construction and operation of the system.

At X, Y and Z are indicated three separate compartments in the railway car, or other structure, each adapted to be separately heated and independently maintained at a predetermined temperature, which temperatures may be different in the different compartments.

At W is indicated a separate space or plurality of spaces, such as a closet at one end of the car, in which the control panel and similar devices may be conveniently grouped.

In the compartment X is positioned the thermostatic control mechanism indicated as an entirety at A, and the valve and an electrically actuated operating mechanism therefor, indicated at B is positioned in or adjacent to the compartment X for regulating the supply of heating medium thereto. Similar thermostatic control mechanisms A' and A'' are positioned respectively in the compartments Y and Z, and similar valve mechanisms B' and B'' are associated respectively with the compartments Y and Z. On the control panel C, which is positioned in the compartment W, are grouped the similar relays D, D' and D'', which are associated respectively with the thermostatically controlled valve operating mechanisms of the three compartments X, Y and Z. It will be understood that there may be any suitable number of compartments, such as X, Y and Z, and that each compartment will have similar mechanisms A, B and D, all of the relays D being grouped on the control panel C. Also positioned on the control panel C is a selector relay E, which is under the control of the fluid-pressure operated selector switch F, and which cooperates with the several relays D to maintain a certain predetermined low temperature in all of the compartments when the railway car is not in service. Also positioned on the control panel C is an automatically reclosing circuit breaker G which cooperates with the several valve-operating circuits. The source of electric power comprises a storage battery H and a generator J which is connected in the circuits in parallel with the battery and which is operated intermittently, in the case of a railway car being geared to one of the axles of the car. At K is indicated an automatic voltage regulator adapted to prevent the voltage from exceeding a predetermined maximum in the lighting circuit, indicated at L. The circuits which include the control thermostats A, A' and A'' are also under the control of the voltage regulator K, and a pilot relay M is provided for placing the voltage regulator K in operation whenever the generator J has developed a predetermined speed and power out-put.

The source of electric power comprises the storage battery H and the generator J, which latter may be operated intermittently to charge the battery H and assist in supplying electrical energy to the power lines. When used on a railway car, the generator J is driven from the running gear of the car, for example, by the sprocket gearing indicated at 1, and driven from an axle 2 of the car. The positive terminal of battery H is connected by wire 3 with the terminal or binding post 4, and the negative terminal of battery H is connected through wire 5 with the binding post 6. The negative terminal of generator J is connected through wire 7 with binding post 6. A wire 8 connects the positive terminal of generator J with the fixed contact member 9 of a generator cut-out switch, the movable contact member 10 of this switch being held in open position by the spring 11. A wire 12 connects the movable contact member 10 with the binding post 4. The magnetic coil 13 of this cut-out switch is connected through wires 14 and 15 with the two terminals of generator J. When the generator is running below an effective speed, or is at rest, the cut-out switch will be opened, but when the generator reaches an effective speed the magnet 13 will be energized sufficiently to attract the armature 10, thus closing the circuit and connecting the generator across the terminals 4 and 6 and in parallel with the battery H. In order that the generator may charge the battery at a proper rate, a suitable regulator is provided in this portion of the circuit, but this feature is well known in the art and is omitted from the present drawing in order to simplify the disclosure. The positive terminal 4 of this source of power is connected through wire 16 with one terminal 17 of the voltage regulator K. The negative terminal 6 of the source of power is connected through wire 18 with one movable contact member 19 of the light switch, indicated as an entirety at N. The other movable contact member 20 of this switch N is connected through wire 21 with a terminal 22 of the voltage regulator K. The two supply wires 23 and 24 between which are connected the lights indicated at L, are connected with the fixed contacts 25 and 26 of switch N. It is to be understood that L indicates the entire lighting system of the railway car. A wire 27 leads from terminal 25 of the switch to a terminal 28 of voltage regulator K.

The voltage regulator K, which is of well known type, comprises a stack of resistance carbons 29, one terminal of which is connected through wire 30 with the terminal 17, and the other terminal of the stack being connected through wire 31 with a terminal 32, which is connected by wire 33 with the terminal 22. A weight 34 is positioned on one arm 35 of a bellcrank lever pivoted at 36, the other arm 37 of this bellcrank pressing against one end of the carbon stack 29 to compress the same and minimize the resistance thereof. The core 38 of a solenoid 39 is connected through stem 40 with the weighted arm of the bellcrank. When the solenoid is energized, the core 38 will be elevated so as to raise the weight 34, thereby decreasing the pressure of arm 37 on the carbon resistance 29 so as to increase the effective resistance of this carbon stack. A partial circuit leads from terminal 28 through wire 41, resistance 42, wire 43, solenoid coil 39, and wire 44 to the terminal 22.

When the switch N is closed, the lights L will be energized through the following circuit: From positive terminal 4 of the source of power through wire 16, terminal 17, wire 30, carbon resistance 29, wire 31, terminal 32, wire 33, terminal 22, wire 21, switch arm 20, contact 26, wire 24, lights L, wire 23, terminal 25, switch arm 19, and wire 18 to the negative terminal 6 of the source of power. At the same time current will flow through the partial shunt circuit extending from terminal 22 through wire 44, solenoid 39, wire 43, resistance 42, wire 41, terminal 28, and wire 27 to the negative contact 25 of switch N. As the voltage tends to increase and a greater current flows through solenoid coil 39, the core 38 will be elevated so as to raise the weight 34 and decrease the pressure on carbon stack 29, thereby increasing the resistance of carbon stack 29, which is interposed in the lighting circuit, thereby decreasing the effective voltage in the lighting circuit and maintaining this voltage at or below a predetermined maximum. This lighting circuit has heretofore been used, but according to the present invention, the same voltage regulator K is utilized to keep the voltage in the control circuits which pass through the thermostatic mechanisms A, A' and A'' below a predetermined maximum.

In order that the voltage regulator K may be effective for regulating the thermostat circuits, even though the light switch N is open, the pilot relay M is utilized to close an energizing circuit for solenoid 39 whenever the generator J is operating at a predetermined effective speed. It is usual to position a signal light 45 at a suitable position within the car, this light being connected across the generator terminals when cut-out switch 10 is closed, through wire 8, switch contacts 9, 9' and 10, and wires 46, 47, 48 and 7. Whenever the cut-out switch has been closed so that the generator is operating to charge the battery, the light 45 will give a visible signal to that effect. The operating coil of relay M may be connected in parallel with the signal light 45 through the partial circuit including wire 49, solenoid coil 50, wire 51 and wire 7. When the generator reaches a certain predetermined effective speed, the coil 50 will be energized sufficiently to elevate the solenoid 52 and lift contact plate 53 so as to bridge the fixed terminals 54 and 55. This will complete an energizing circuit for the controlling solenoid 39 of voltage regulator K as follows: From positive terminal 22 of the voltage regulator through wire 44, solenoid coil 39, wire 43, resistance 42, wire 41, terminal 28, wire 56, fixed contact 54, movable contact plate 53, fixed contact 55, and wires 57, 51 and 7 to the negative terminal 6.

The positive supply line for the thermostatic control circuits extends from the positive terminal of the source of power through wire 16, terminal 17, wire 30, carbon resistance 39, wire 31, terminal 32, and wire 58 to the binding post 59 on panel board C. The negative supply line runs from negative terminal 6 of the source of power through wires 18 and 60 to the binding post 61 on the panel board. The positive and negative supply lines 62 and 63 respectively on the panel board are connected through the fuses indicated at 64 with the respective binding posts 59 and 61.

The actuating circuits for the several valve-operating mechanisms B, B' and B'' comprise a separate positive line extending from wire 16 through wire 65 to a binding post 66 on the panel board C. The same negative return line comprising wires 63 and 60 is utilized as in the thermostatic control circuits. The voltage regulator K is not included in these valve-operating circuits, but these circuits pass through a circuit breaker G which is adapted to open whenever an overload occurs in any of these valve-operating circuits. This circuit breaker G is preferably of the automatic reclosing type disclosed more in detail and claimed in the copending application of Parks and Miller, Serial No. 609,436, filed May 5, 1932. The current for the valve-operating circuits flows from terminal 66 through wire 67 to and through the several switches and solenoids of the valve-operating circuits as hereinafter described, back through wire 68 to the fixed contact 69 of circuit breaker G, through movable contact plate 70 to fixed contact 71, thence through wire 72, thermal-resistance 73 and wire 74 to the negative line 63. When an over-load occurs in one or more branches of the valve-operating circuits, or when the current flows for an excessive length of time, the thermal-resistance 73 will heat the bi-metallic thermostatic bar 75 so as to cause this bar to warp and bring the movable contact 76 into engagement with fixed contact 77, thus completing a shunt circuit extending from positive terminal 66 through wire 78, solenoid coil 79, contacts 77 and 76, thermostatic bar 75, resistance 73 and wire 74 to the negative line 63. The solenoid 79 will lift the core 80 which is connected through stem 81 with the contact bar 70 so as to move this contact bar away from the fixed contacts 69 and 71 and thus break the operating circuits previously described. At the same time an energizing circuit will be completed through the signal light 85 (or equivalent signaling device) this circuit being as follows: From positive terminal 66 through wire 84, light 85, wire 86, fixed contact 82, movable contact plate 70, fixed contact 83, wire 72, thermal-resistance 73, and wire 74 to the negative line 63. The lamp 85 will remain lighted as long as the circuit breaker is in open position. When the thermostatic bar 85 cools, it will warp back so as to separate the contacts 76 and 77 and break the energizing circuit for solenoid 79, but means (not here shown) are provided to delay this action so that the main operating circuits will remain broken for an appreciable length of time. When the solenoid 79 is thus de-energized, the movable contact 70 will again drop into engagement with the fixed contacts 69 and 71, thus again completing the operating circuits. If the overload or other trouble still remains in one or more of these operating circuits, the thermostatic bar 75 will again be heated and will warp so as to close the energizing circuit for solenoid 79, thus again breaking the valve-operating circuits. The lamp 85 will again be lighted to indicate this condition. This cycle of events will repeat themselves until the trouble is eliminated.

Each of the relays D, D' or D'' comprises a solenoid coil 87 which, when energized, will draw up a core 8 connected by stem 89 to a movable contact plate 90 so as to bring this contact plate into position to bridge a pair of fixed contacts 91 and 92. When the coil 87 is de-energized, or insufficiently energized, the core 88 will drop so as to bring movable contact plate 90 into position to bridge the fixed contacts 93 and 94. The solenoid coil 87 is normally energized so as to maintain the movable contact plate 90 in its elevated position by means of a circuit extending from positive supply line 62 through wire 95, resistance 96, solenoid coil 87, resistance 97 and wire 98 leading back to the negative supply line 63. Wires 99 and 100 lead from the respective terminals of solenoid coil 87 to a pair of binding posts 101 and 102, respectively on panel board C. Control circuits leading from the thermostatic mechanism A (or the mechanisms A' or A'', as the case may be) connect with the binding posts 101 and 102 so that when a certain predetermined temperature is reached in the compartment X (or Y or Z) the energizing circuit for solenoid coil 87 will be short-circuited through the thermostatic mechanism, thereby de-energizing the solenoid and permitting the contact plate 90 to drop into engagement with the lower fixed contacts 93 and 94.

Each of the thermostatic mechanisms A, A' and A'' comprises a plurality of similar mercury-tube thermostats, in the present example the three thermostats 103, 104 and 105. A wire 106 leading from binding post 102 on the panel board C connects into the lower portion of each of the thermostats so as to be in constant engagement with the mercury column therein. A terminal 107 is positioned in the tube of thermostat 103 (which may be called the "high temperature" thermostat) so that this terminal will be engaged by the mercury column of this thermostat when a temperature of 72° F., for example, is reached in the compartment X. A similar terminal 108 is fixed in mercury tube 104 which may be called the "medium temperature" thermostat so as to be engaged by the mercury column at a temperature of, for example, 70° F. Similarly, the fixed contact 109 in the "low temperature" thermostat 105 is engaged by the mercury column at a temperature of, for example, 50° F. By means of the manual adjusting switch, indicated generally at P, the system may be placed under control of any one of these three thermostats. This switch comprises an indicating lever 110 pivoted intermediately at 111 and in constant engagement at its upper end with the fixed arcuate contact plate 112. The other end of the lever 110 is adapted to engage alternatively with some one of the fixed contacts 113, 114 or 115. A wire 116 connects terminal 107 of the high temperature thermostat with the fixed contact plate 112. Wire 117 leads from contact 108 of thermostat 104 to the fixed contact 114. A wire 118 leads from contact 109 of the low temperature thermostat to the fixed contact 115. There is no wire connection with the third contact member 113. Wire 119 leads from the binding post 101 on the panel board C to the wire 116, and thence to the fixed contacts 107 and 112. A third line wire 120 leads from the fixed contact 109 of low temperature thermostat 105 to a binding post 121 positioned on panel board C for a purpose hereinafter described, this wire 120 not being used in the normal operation of the thermostatic control mechanism.

With the switch P adjusted to the position shown in compartment X the high temperature thermostat 103 will be in control. When the predetermined temperature is reached in the compartment X, a shunt circuit will be completed around the solenoid coil 87 as follows: Through wire 99, 119, and 116, terminal 107, thermostat 103, and wires 106 and 100 to the other terminal of solenoid 87. This will serve to deenergize the solenoid and permit the contact plate 90 to fall to its lower position in engagement with fixed contacts 93 and 94. This will complete an operating circuit which will move the valve B to its closed position, as hereinafter described. When the temperature in compartment X falls below the predetermined temperature for which thermostat 103 is set, the shunt circuit just described will be broken at the terminal 107 and solenoid 87 will again become energized so as to again raise the contact plate 90 into engagement with the fixed contacts 91 and 92, thus completing an operating circuit which will move valve B to its open position. When switch P is adjusted to the position shown in compartments Y and Z, the "medium temperature" thermostat 104 will be in control. At a somewhat lower temperature, for example 70° F., this thermostat 104 will complete a shunt circuit to de-energize the solenoid 87, as follows: Through wires 99, 119 and 116, contact plate 112, switch arm 110, contact 114, wire 117, thermostat terminal 108, medium temperature thermostat 104, and as before, through wires 106 and 100 to the other terminal of solenoid 87. When the low temperature is to be maintained, the switch arm 110 is moved over so that its lower end is in engagement with the fixed contact 115. At this time a shunt circuit similar to the one last described will extend from contact plate 112 through switch arm 110, fixed contact 115, wire 118, terminal 109, and low temperature thermostat 105, and thence as before back to the other terminal of solenoid 87.

The valve B (or B' or B", as the case may be) comprises a casing 122 in which is a movable valve member controlled by the lever 123 intermediately pivoted at 124. In the example here shown, the valve being part of a vapor heating system, steam or vapor flows into the valve through pipe 125 and, if the valve is in the open position, as shown at valve B in compartment X, the steam flows out to and through the radiating system and back to the valve through pipes 126, 127 and 128, the vapor and condensate returning to the vapor regulator through pipe 129. When the lever 123 is swung over in the opposite direction, as shown in connection with valves B' and B" in compartments Y and Z, the valve will be closed and the steam will flow into casing 122 through pipe 125 and back to the vapor regulator through pipe 129, but will not flow to the radiators.

The electrically actuated valve-operating mechanism comprises a pair of solenoid motors 130 and 131, having cores 132 and 133, respectively, mounted at the opposite ends of a slide rod or stem 134, which is intermediately connected with one arm of the valve-operating lever 123. The opposite end of lever 123 is connected with a snap switch 135 having a movable contact arm 136 which is snapped out of engagement with a fixed contact 137 and into engagement with a fixed contact 138 when valve lever 123 reaches the open position shown in connection with valve B, and which, conversely, is snapped out of engagement with fixed contact 138 and into engagement with fixed contact 137 as the valve reaches the closed position shown in compartments Y and Z. The fixed contacts 137 and 138 of the snap switch are connected through wires 139 and 140, respectively, with one terminal of each of the motor coils 130 and 131. The other terminals of these coils are connected through wires 141 and 142, respectively, with a pair of binding posts 143 and 144 on panel board C adjacent the relay D. A wire 145 connects binding post 143 with the fixed contact 92 of relay D and a wire 146 connects binding post 144 with fixed contact 94. The wire 68 leading from contact 69 of the circuit breaker G on the panel board leads to the several wires 147 which connect with the movable contact members 136 of snap switches 135.

Adjacent each relay D on the panel board is a cut-out or test switch 148 comprising an arm pivoted at one end 149 and engaging at its other end with a fixed contact 150 when in its normal closed position, as shown in connection with relays D and D'. When swung over to the open position shown in relay D", the switch arm 148 engages with a second fixed contact 151. A wire 152 connects the pivoted end 149 of switch lever 148 with the two fixed contact members 91 and 93 of the adjacent relay D. The positive supply line 67 leading from binding post 66 on the panel board has branches connecting with the several fixed contacts 150 of the cut-out or test switches.

In describing the normal operation of this portion of the system, we will assume that the parts are initially in the position shown in compartment X. As there shown, the high temperature thermostat is in control, the temperature at this time is somewhat below the predetermined temperature for which thermostat 103 is set, and the valve B is open and heat is being supplied to the compartment. At this time, relay D is energized and movable contact plate 90 is held in its elevated position. When the temperature in compartment X reaches the desired maximum, the control circuit through high temperature thermostat 103 will be completed, the relay 87 will be short-circuited, and the movable contact 90 will drop to the position shown in relay D' on the panel board. A valve-operating circuit will now be completed as follows: From positive supply line 67 to fixed switch contact 150, switch arm 148, wire 152, fixed relay contacts 93 and 94 and movable contact plate 90, wire 146, binding post 144, wire 142, solenoid coil 131, wire 140, fixed and movable contacts 138 and 136 of snap switch 135, and wires 147 and 68 back to circuit breaker G and thence to the negative supply line 63. Solenoid motor 131 will be energized to swing the valve to the closed position and at the end of this movement the snap switch will be operated to break the circuit just described at the contacts 136 and 138 of the snap switch, the parts now being in the position shown in connection with valves B' and B". When the temperature in the compartment falls again so as to break the control circuit through the thermostat 103, the relay coil 87 will again be energized to lift the contact plate 90 to the position shown in relay D, whereupon a second operating circuit will be completed as follows: As in the circuit last described through wire 152, fixed contact 91, movable contact plate 90, fixed contact 92, wire 145, binding post 143, wire 141, solenoid coil 130, wire 139, snap switch contacts 137 and 136, and thence as before back to the circuit breaker G and the negative main 63. The solenoid motor 130 will now be energized to move the valve back to the position shown in connection with valve B in compartment X.

In compartment Y, it will be noted that the system is under the control of the "medium" temperature thermostat, that this temperature has been reached in this compartment, and that the valve B' has been closed. In compartment Z, the system is under the control of the medium temperature thermostat, and the temperature has fallen below this medium temperature, but the valve B'' is still closed. This is because the cut-out switch 148 associated with relay D'' has been moved to its open position, thus rendering the control system for compartment Z temporarily inoperative. If this switch 148 were closed, the valve B'' will immediately be opened and the control system would operate exactly as described hereinabove.

When a car is taken out of service for any considerable length of time, it is not necessary or economical to maintain the compartments at one of the higher temperatures, but it is desirable in order to prevent injury to the car and its contents to not permit the temperature to drop below a certain predetermined low temperature, for example, the temperature of 50° F. which is maintained by the low temperature thermostat 105. Means is provided, therefore, to automatically maintain all of the compartments at this low temperature when the car is out of service no matter what the positions of the several manually adjustable switches P may be, and no matter whether the cut-out switches 148 are in the normal or "off" positions. This portion of the mechanism comprises the fluid-pressure operated selector switch F, and the selector relay E on the panel board. The switch F comprises a Bourdon tube 153 closed at its free end 154 and connected at its fixed end 155 with one of the air-pressure pipe lines on the car. A plurality of spring contacts 156, 157 and 158 are normally out of engagement with one another, but are adapted to be bridged by a movable contact bar 159 carried by the cam member 160 pivoted at 161. The vertically movable bar 162 carries a roller 163 at its upper end which bears against the cam 160, being held in this position by spring 164, and the lower end of bar 162 is connected through bellcrank 165 and link 166 with the free end 154 of the Bourdon tube. When normal air pressure is present in the pipe line on the car, the Bourdon tube will be expanded to the position shown in the drawing, thereby drawing down rod 162 so that the engagement of roller 163 with cam 160 will force the movable contact bar 159 up to the position shown in which it is out of contact with any of the spring contacts 157, 158 and 159. When the car is out of service and air pressure in the pipe line is dissipated, the Bourdon tube 153 will coil inwardly or contract so as to move the roller 163 upwardly. The upper surface of cam 160 will then be engaged so as to snap the contact bar 159 downwardly into position to bridge the three spring contacts 156, 157 and 158. Wire 167 connects the positive binding post 66 on the panel board C with the intermediate spring contact 157. Wire 168 extends from spring contact 156 and has branches leading to the several fixed contacts 151 of the cut-out switches 148. A wire 169 leads from the spring contact 158 to the solenoid coil 170 of the selector relay E on the panel board. A wire 171 leads from the other terminal of coil 170 to the negative supply line 63. When the solenoid coil 170 is energized, it will elevate the core 170' so as to lift the plate 172 carrying a plurality of contacts 173 and bringing these respectively into engagement with a similar series of unconnected fixed contacts 174. One of the movable contacts 173 is connected through wire 175 with the binding post 101 of relay D. The corresponding fixed contact 174 is connected through wire 176 with the binding post 121 of relay D. The other pairs of contacts 173 and 174 are similarly connected with the similar binding posts of the other relays D' and D''. When the car is out of service, the selector switch F will close a circuit energizing the selector relay E, this circuit being as follows: From positive terminal 66 through wire 167, contacts 157, 159 and 158 of the selector switch F, wire 169, solenoid coil 170, and wire 171 to the negative line 63. The plate 172 will be elevated so as to connect the respective pairs of contacts 173 and 174. A thermostatic control circuit including the low temperature thermostat 105 will now be completed for each of the relays D, D' and D'', each one of these circuits being as follows: From terminal 101 of the relay through wire 175, contact 173, contact 174, wire 176, wire 120, fixed contact 109 of thermostat 105, and wire 106 back to the binding post 102 of the relay. This circuit will place the low temperature thermostat in control of the system regardless of the position in which the manually controlled switch P has been left. It will be apparent that the maximum temperature for which thermostat 105 is set will be reached before the circuits through either of the other thermostats 103 or 104 can be closed, so the setting of switch P will be ineffective so long as the circuit just described through low temperature thermostat 105 is complete. In the event that one of the compartment control systems has been placed out of service by opening the switch 148 (as shown for example in compartment Z), an actuating circuit for the valve B'' is now completed from positive terminal 66 through wire 167, contacts 157, 159 and 156 of switch F, wire 168 to the terminal 151 of switch 148 and from this switch, as in the normal circuit, through the relay and the solenoid coils of the valve. The mechanism will therefore be effective to maintain the desired low temperature in the compartment Z even though the cut-out switch 148 has been left in open position. Of course, this same condition will hold true for any one of the compartments in case the cut-out or test switch for that compartment is closed.

Under some circumstances it may be desirable to heat one or more of the compartments to a higher temperature when the car is out of service. In order to make this possible, the pivoted cam 177 is provided which may be rotated by means of knob 178 into engagement with the spring contact member 158 so as to temporarily push this spring contact out of engagement with the bridging contact 159. This will break the energizing circuit for the selector relay E, thus returning the heating system in each compartment to the control of the thermostatic mechanism as determined by the shutting of the manual switch P.

In the ordinary operation of this system, in the example here disclosed, the only portion of the mechanism which will be accessible to the occupants of the compartments X, Y or Z will be the temperature adjusting switches P. By adjusting this switch the occupant of the compartment may select the most desirable temperature, within certain limits. The panel board C, and the other mechanism shown in compartment W will only be accessible to the porter or other authorized attendant.

It will be noted that the circuits which include the thermostatic mechanisms A and the relays D are entirely independent of the operating circuits for the valves B, although both derive their energy from the same source of power, that is the battery H and generator J. The lights L are also energized from this same source. A rather heavy current is necessary for energizing the valve-operating motors 130 or 131, but this current will normally only flow for a very short time, the operating circuit being broken by the snap switch 135 as soon as the valve movement has been completed. In case one of the valves should stick for any reason and the operating current should flow for an abnormally long length of time, the resistance 73 in the automatic circuit breaker G will become heated and this circuit breaker will operate to temporarily interrupt this operating circuit. After a certain lapse of time, this automatically reclosing circuit breaker will operate to again complete this circuit and in case the trouble was only temporary, the circuit will remain closed, but if the trouble still exists, the circuit will again be interrupted and this cycle of events will repeat itself, the signal lamp 85 flashing on and off at intervals to give visible indication of this condition. It would be undesirable to have the thermostatic circuits interrupted in this manner since the momentary making and breaking of these circuits would be apt to cause incomplete impulses to be given to the valve operating mechanism which would leave the valves in intermediate or partly opened or closed position, thus rendering the heating systems inoperative or not properly effective. For this reason the thermostatic circuits do not include the automatic circuit breaker G but are continuously closed despite the operation of the circuit breaker G, although the fuses 64 are interposed in this circuit to protect this portion of the mechanism against any dangerous current flow. It is, however, desirable to keep the currents which flow through the thermostats below a predetermined maximum, since excessive currents will cause deterioration of the thermostatic mechanism, and for this reason the same voltage regulator K which is used in connection with the lighting system L is interposed in the thermostatic circuits to keep the voltage in these circuits from exceeding a predetermined maximum.

In case trouble develops in one of the valve-operating circuits, as indicated by the flashing of signal light 85 on the panel board, the attendant may, by successively opening the cut-out or test switches 148 and observing the action of the signal light 85, localize the particular circuit in which the trouble is occurring, and this circuit may be temporarily cut out of service by leaving the switch 148 open until the trouble is removed without affecting the operation of the other compartment heating systems.

We claim:

1. In a temperature regulating system, a source of electric power comprising a battery, and a generator connected in parallel with the battery and operated intermittently, a valve controlling the supply of heating medium to a compartment to be heated, a thermostatic mechanism responsive to temperature changes in the compartment, a control relay, a control circuit including the thermostatic mechanism, the relay and the source of power, a maximum voltage controller in this circuit, an electrically actuated valve operating mechanism, and an actuating circuit controlled by the relay and including the valve operating mechanism and the source of power.

2. In a temperature regulating system, a source of electric power comprising a battery, and a generator connected in parallel with the battery and operated intermittently, a valve controlling the supply of heating medium to a compartment to be heated, a thermostatic mechanism responsive to temperature changes in the compartment, a control relay, a control circuit including the thermostatic mechanism, the relay and the source of power, a maximum voltage controller in this circuit, an electrically actuated valve operating mechanism, an actuating circuit controlled by the relay and including the valve operating mechanism and the source of power, and an automatically reclosing circuit-breaker in the actuating circuit.

3. In a temperature regulating system, a source of electric power comprising a battery, and a generator connected in parallel with the battery and operated intermittently, a plurality of valves each controlling the supply of heating medium to a separate compartment to be heated, a plurality of separate thermostatic mechanisms one in each compartment and responsive to heat temperature changes in that compartment, a plurality of similar control relays, one for each compartment, a maximum voltage controller, a control circuit including the source of power and the voltage controller and having a plurality of parallel branches, each branch including one of the thermostatic mechanisms and one of the relays, a plurality of electrically actuated valve operating mechanisms one for each valve, and an actuating circuit including the source of power and having a plurality of parallel branches, each branch including one valve operating mechanism and being controlled by one of the relays.

4. In a temperature regulating system, a source of electric power comprising a battery, and a generator connected in parallel with the battery and operated intermittently, a plurality of valves each controlling the supply of heating medium to a separate compartment to be heated, a plurality of separate thermostatic mechanisms one in each compartment and responsive to heat temperature changes in that compartment, a plurality of similar control relays, one for each compartment, a maximum voltage controller, a control circuit including the source of power and the voltage controller and having a plurality of parallel branches, each branch including one of the thermostatic mechanisms and one of the relays, a plurality of electrically actuated valve operating mechanisms one for each valve, an actuating circuit including the source of power and having a plurality of parallel branches, each branch including one valve operating mechanism and being controlled by one of the relays, and an automatically reclosing circuit-breaker in the actuating circuit.

5. In a temperature regulating system, a source of electric power comprising a battery, and a generator connected in parallel with the battery and operated intermittently, a plurality of valves each controlling the supply of heating medium to a separate compartment to be heated, a plurality of separate thermostatic mechanisms one in each compartment and responsive to heat temperature changes in that compartment, a control panel, a plurality of similar control relays on the panel, one for each compartment, a maximum voltage controller, a control circuit including the source of power and the voltage controller and having a plurality of parallel branches, each branch including one of the thermostatic mechanisms and one of the relays, a plurality of cut-out test switches one in each branch circuit and positioned on the control panel, a plurality of electrically actuated valve-operating mechanisms one for each valve, an actuating circuit including the source of power and having a plurality of parallel branches, each branch including one valve operating mechanism and being controlled by one of the relays, and an automatically reclosing circuit breaker in the actuating circuit, said circuit breaker including a signal device positioned on the panel and operative when the actuating circuit is broken at the circuit breaker.

6. In combination, in a temperature regulating system, a source of electric power comprising a battery and a generator connected in parallel with the battery and operated intermittently, a pair of operating circuits energized from this same source of power, said circuits consisting of a control circuit adapted to carry a relatively weak current for comparatively long periods of time, and an actuating circuit adapted to carry a relatively large current for comparatively short periods of time, an automatically reclosing circuit-breaker in the actuating circuit, the control circuit not being effected by the operation of this circuit-breaker, and a maximum voltage regulator in the control circuit.

7. In a temperature regulating system, a panel board, a plurality of relays mounted in the panel board, one relay for each of a plurality of compartments to be heated, thermostatic control circuits connected with and operating the respective relays, valve-operating circuits controlled by the relays, a plurality of cut-out switches mounted in the panel board one in the valve operating circuit of each relay, an automatic circuit-breaker mounted in the panel board and connected in the valve operating circuits, and a signalling device in the panel board which becomes effective when the circuit breaker operates to open the valve operating circuits.

8. In a temperature regulating system, a panel board, a plurality of relays mounted in the panel board, one relay for each of a plurality of compartments to be heated, thermostatic control circuits connected with and operating the respective relays, valve-operating circuits controlled by the relays, a plurality of cut-out switches mounted in the panel board one in the valve operating circuit of each relay, an automatically reclosing circuit-breaker mounted in the panel board and connected in the valve operating circuits, and a signalling device in the panel board which becomes effective when the circuit breaker operates to open the valve operating circuits.

9. In a temperature regulating system, a panel board, a plurality of relays mounted in the panel board, one relay for each of a plurality of compartments to be heated, thermostatic control circuits connected with and operating the respective relays, valve-operating circuits controlled by the relays, a plurality of cut-out switches mounted in the panel board one in the valve operating circuit of each relay, an automatic circuit-breaker mounted in the panel board and connected in the valve operating circuits, and a signal light in the panel board which is automatically lighted when the circuit breaker operates to open the valve operating circuits.

10. In a temperature regulating system, a source of electric power, a plurality of valves each controlling the supply of heating medium to a separate compartment to be heated, a plurality of electrically actuated valve operating mechanisms one for each valve, a plurality of separate thermostatic mechanisms one in each compartment and responsive to temperature changes in that compartment, a control panel, a plurality of similar control relays on the panel, one for each compartment, a control circuit including the source of power and having a plurality of parallel branches, each branch including one of the thermostatic mechanisms and one of the relays, a plurality of cut-out test switches one in each branch circuit and positioned on the panel, an actuating circuit including the source of power and having a plurality of parallel branches, each branch including one of the valve operating mechanisms and being controlled by one of the relays, and an automatically reclosing circuit-breaker in the actuating circuit, said circuit breaker including a signalling device positioned on the control panel and operating when the actuating circuit is broken at the circuit-breaker.

11. In a temperature regulating system, a source of electric power, a plurality of valves each controlling the supply of heating medium to a separate compartment to be heated, a plurality of electrically actuated valve operating mechanisms one for each valve, a plurality of separate thermostatic mechanisms one in each compartment and responsive to temperature changes in that compartment, each thermostatic mechanism comprising manually adjustable mechanism for setting the thermostatic mechanism to selectively maintain one of a plurality of temperatures in the compartment, a control panel, a plurality of similar relays on the panel one for each compartment, a control circuit including the source of power and having a plurality of parallel branches, each branch including one of the thermostatic mechanisms and one of the relays, an actuating circuit including the source of power and having a plurality of parallel branches, each branch including one of the valve operating mechanisms and being controlled by one of the relays, a normally open switch held open by a separate source of power, this switch automatically closing when this latter source of power is ineffective, a selector relay on the panel board, an actuating circuit closed by the switch for energizing the selector relay, and branch circuits controlled by the selector relay for causing all of the thermostatic mechanisms to maintain a predetermined temperature in the compartments regardless of the manual setting of each of the thermostatic mechanisms.

12. The combination with a car and a pipe on the car which contains fluid under pressure when the car is connected in service as a unit of a train, a temperature regulating system comprising a source of electric power, a plurality of valves each controlling the supply of heating medium to a separate compartment to be heated, a plurality of electrically actuated valve-operating mechanisms one for each valve, a plurality of separate thermostatic mechanisms one in each compartment and responsive to temperature changes in that compartment, each thermostatic mechanism comprising a manually adjustable mechanism for setting the thermostatic mechanism to selectively maintain one of a plurality of temperatures in the compartment, a plurality of similar relays one for each compartment, a control circuit including the source of power and having a plurality of parallel branches, each branch including one of the thermostatic mechanisms and one of the relays, an actuating circuit including the source of power and having a plurality of parallel branches, each branch including one of the valve-operating mechanisms and being controlled by one of the relays, a normally open selector switch, means actuated by fluid pressure from the pipe for holding the switch open, said means closing the switch when operating fluid pressure is absent from the pipe, a selector relay, an actuating circuit closed by the selector switch for energizing the selector relay, and branch circuits controlled by the selector relay for causing all of the thermostatic mechanisms to maintain a minimum predetermined temperature in the compartments regardless of the manual setting of each of the thermostatic mechanisms.

13. The combination with a car and a pipe on the car which contains fluid under pressure when the car is connected in service as a unit of a train, a temperature regulating system comprising a source of electric power, a plurality of valves each controlling the supply of heating medium to a separate compartment to be heated, a plurality of electrically actuated valve-operating mechanisms one for each valve, a plurality of separate thermostatic mechanisms one in each compartment and responsive to temperature changes in that compartment, each thermostatic mechanism comprising a manually adjustable mechanism for setting the thermostatic mechanism to selectively maintain one of a plurality of temperatures in the compartment, a control panel, a plurality of similar relays on the panel one for each compartment, a control circuit including the source of power and having a plurality of parallel branches, each branch including one of the thermostatic mechanisms and one of the relays, and actuating circuit including the source of power and having a plurality of parallel branches, each branch including one of the valve-operating mechanisms and being controlled by one of the relays, a normally open selector switch, means actuated by fluid pressure from the pipe for holding the switch open, said means closing the switch when operating fluid pressure is absent from the pipe, a selector relay on the panel board, an actuating circuit closed by the selector switch for energizing the selector relay, branch circuits controlled by the selector relay for causing all of the thermostatic mechanisms to maintain a minimum predetermined temperature in the compartments regardless of the manual setting of each of the thermostatic mechanisms, a plurality of cut-out switches on the panel board, one in each branch of the actuating circuit for the valve-operating mechanisms, and an auxiliary circuit which is closed by the selector switch when closed and by one or more of the cut-out switches when moved to open position for causing all of the valves to be operative to maintain the predetermined minimum temperature regardless of the position of the cut-out valves.

PAUL B. PARKS.
WILLIAM M. SMITH.